United States Patent [19]

Yokoyama et al.

[11] Patent Number: 4,721,496
[45] Date of Patent: Jan. 26, 1988

[54] TOOTHED BELT

[75] Inventors: Nobuyuki Yokoyama; Shigehiro Isshiki, both of Yamatokoriyama, Japan

[73] Assignee: Unitta Co., Ltd., Yamatokoriyama, Japan

[21] Appl. No.: 927,493

[22] Filed: Nov. 5, 1986

[30] Foreign Application Priority Data

Dec. 27, 1985 [JP] Japan ................. 60-298919

[51] Int. Cl.⁴ .................... F16G 5/08; F16G 5/20
[52] U.S. Cl. .................... 474/205; 474/263; 474/268
[58] Field of Search ............ 474/202, 204, 205, 263, 474/264, 268; 156/137

[56] References Cited

U.S. PATENT DOCUMENTS

| | | | |
|---|---|---|---|
| 3,464,875 | 9/1969 | Brooks et al. | 474/263 X |
| 3,607,499 | 9/1971 | Garbin | 156/137 |
| 3,660,974 | 5/1972 | Marzocchi et al. | 57/153 |
| 4,053,547 | 10/1977 | Redmond, Jr. | 156/137 X |
| 4,169,393 | 10/1979 | Wetzel et al. | 474/268 X |
| 4,632,665 | 12/1986 | Skura | 474/268 X |

FOREIGN PATENT DOCUMENTS 2532245  3/1984  France .
59-222639 12/1984 Japan .
60-172749  9/1985 Japan .

*Primary Examiner*—Stephen J. Novosad
*Assistant Examiner*—Thuy M. Bui
*Attorney, Agent, or Firm*—Spencer & Frank

[57] ABSTRACT

A toothed belt with improved durability, comprising: a back surface section and tooth section that are made of a hydrogenated acrylonitrile-butadiene copolymer (H-NBR) with a hydrogenation rate of 80% or more, a tooth cloth that covers said tooth section and tooth lands positioned between the adjacent tooth sections, said tooth cloth being made of industrial nylon raw fiber with a viscosity relative to sulfuric acid of 2.6 to 2.8, a tensile strength of 5 g/denier or more, and a fineness of single fibers of 5 denier or less, and a plurality of core fibers with a core diameter of 0.9 to 1.1 mm and a ratio of said core diameter to said tooth cloth thickness in the range of 1.8 to 5.0, said core fibers being made of glass fiber filaments with a first twist number of 1.7 to 2.6 twists/inch, and a final twist number of 1.8 to 2.3 twists/inch, twisted together.

3 Claims, 3 Drawing Figures

TOOTHED BELT

BACKGROUND OF THE INVENTION

1. Field of the Invention

This invention relates to a toothed belt, for example, for driving the overhead cam shaft of an automobile, and more particularly it relates to a toothed belt having great durability that makes possible a long life-span under severe conditions.

2. Description of the Prior Art

Unlike flat belts or V-shaped belts, toothed belts do not slip, and thus have a high transmission efficiency. In addition, compared to transmission apparatus such as gears, chains, etc., the toothed belts have the advantage of very little noise. Thus, toothed belts are used for simultaneous drive in such places as automotive overhead cam shafts, and their use is increasing.

A conventional toothed belt is constructed, as shown in FIG. 1, by a back surface section 1 and tooth sections 2, both of which are made of an elastic substance such as rubber, a tooth cloth 3, which covers the tooth sections 2 and the tooth lands 5 positioned between the adjacent tooth sections 2 to prevent abrasion arising from friction between the belt and the pulleys, and a plurality of core fibers 4 placed on the inner surface of the back surface section 1 in the long direction so as to touch the tooth cloth 3. This toothed belt is used, for example, for simultaneous drive of the overhead cam shaft of an automobile. A toothed belt for the driving of an overhead cam shaft moves at high speeds under a heavy load and at high temperatures. When a large number of pulleys are used, the belt moves with many bends. Because a toothed belt for driving an overhead cam shaft is used under conditions of high temperatures, the elastic substance such as rubber, etc., that is used for the construction of the back surface section 1 and the tooth sections 2 undergoes aging, which gives rise to severe cracking. Because of movement at high speed under a heavy load, the friction between the pulleys and the tooth cloth 3 that touches the said pulleys is great, which easily gives rise to cracking, shear, etc., resulting in damage. Moreover, a high pressure arises in the tooth sections 2 engaged with the pulleys, which easily gives rise to cracking, shear, etc., also resulting in damage. Moreover, when the toothed belt moves with a number of bends due to many pulleys, heat is generated inside of the belt by friction between the core fibers 4 and the elastic substance forming both the back surface section 1 and the tooth sections 2, which causes the acceleration of deterioration of either core fibers or elastic substance. For these reasons, conventional toothed belts for driving overhead cam shafts cannot be operated for long periods of time.

Rubber such as chloroprene rubber (CR) or the like has been used for the back surface section 1 and the tooth sections 2 of conventional toothed belts, but it is inferior in durability. To improve durability when used under severe conditions, kinds of rubber with superior resistance to heat are used, such as epichlorohydrin rubber (CHR), chlorosulphonated polyethylene methylene linkage (CSM), ethylene-propylene-diene methylene linkage (EPDM), etc. However, CHR is inferior in thermosetting and cold resistance. CSM allows the generation of much internal heat and is inferior in cold resistance and oil resistance. EPDM has unsatisfactory oil resistance.

The tooth cloth 3, which functions to prevent abrasion by the friction of the pulleys with the elastic substance of the back surface section 1 and the tooth sections 2, has been made of nylon raw fibers for clothing, which are fine, with the fineness of 2 to 3 deniers for single fibers, and with the relative viscosity with respect to sulfuric acid of around 2.5, so that movement under severe conditions, i.e., at high temperatures, high speeds, and heavy loads, results in serious abrasion. If the tooth cloth is damaged by abrasion, there is a danger that the rubber of the tooth sections 2 and/or the core fibers 4 inside of the tooth lands 5 come into contact with the pulleys, so that the tooth sections 2, etc., cannot be protected, and the toothed belt loses durability.

The core fibers 4 are usually made of twisted bundles of glass fiber filaments. Each of the core fibers 4 takes on some of the load on the toothed belt while the belt moves, and the core fibers also act to prevent stretching of the belt. However, the core fibers 4 cause the generation of internal heat by their friction with the back surface section 1 and/or the tooth sections 2. Internal heat causes accelerated aging of the elastic substance of the back surface section 1 and the tooth sections. Moreover, it causes a decrease in the bonding strength between the elastic substance and the tooth cloth 3.

SUMMARY OF THE INVENTION

The inventors have found from their experimental results that when a hydrogenated acrylonitrilebutadiene copolymer (H—NBR) with a hydrogenation rate of 80% or more is used as an elastic substance for the back surface section 1 and the tooth sections 2 of a toothed belt, the resulting toothed belt has an excellent durability, and can be used for long periods of time under severe conditions. Moreover, they have found that when the tooth cloth 3 is constructed not of the conventional nylon raw fiber for clothing, but of industrial nylon raw fiber, it adheres firmly to the H—NBR with a hydrogenation rate of 80% or more that is used as an elastic substance for the back surface section 1 and the tooth sections 2, resulting in an improvement of durability of the resulting toothed belt. They have also found that when the H—NBR with a hydrogenation rate of 80% or more is used as an elastic substance and the industrial nylon raw fiber is used for the tooth cloth, the durability of the toothed belt would be improved surprisingly, provided that the core fibers 4 made of glass fiber filaments twisted together had a first twist number and final twist number with values within certain limits, and provided that the diameter of the core fibers was also within certain limits.

The toothed belt of this invention, which overcomes the above-discussed and numerous other disadvantages and deficiencies of the prior art, comprises (1) a back surface section and tooth section that are made of a hydrogenated acrylonitrile-butadiene copolymer (H—NBR) with a hydrogenation rate of 80% or more, (2) a tooth cloth that covers said tooth section and tooth lands positioned between the adjacent tooth sections, said tooth cloth being made of industrial nylon raw fiber with a viscosity relative to sulfuric acid of 2.6 to 2.8, a tensile strength of 5 g/denier or more, and a fineness of single fibers of 5 denier or less, and (3) a plurality of core fibers with a core diameter of 0.9 to 1.1 mm and a ratio of said core diameter to said tooth cloth thickness in the range of 1.8 to 5.0, said core fibers being made of glass fiber filaments with a first twist number of 1.7 to 2.6 twists/inch, and a final twist number of 1.8 to 2.3 twists/inch, twisted together.

Thus, the invention described herein makes possible the objects of (1), providing a toothed belt that has such excellent durability that even under such severe conditions as at high temperatures, high speeds, and heavy loads, the belt can be operated for long periods of time; (2) a toothed belt in which a back surface section and tooth sections made of H—NBR with a hydrogenation rate of 80% or more, a tooth cloth made of industrial nylon raw fiber, and core fibers made of glass fiber filaments with a first twist number and final twist number within certain limits and with a diameter within certain limits are used, so that the said H—NBR, the said nylon raw fibers, and the said glass fibers can adhere firmly to each other, which helps inhibit the generation of internal heat and markedly elevated the durability of the belt, resulting in the possibility of operation of the belt for long periods of time under severe conditions as at high temperatures, high speeds, and heavy loads; and (3) providing a toothed belt that can be used widely, for example, for driving the overhead cam shaft of an automobile, since the said belt can be operated for long periods of time under the severe conditions mentioned above.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
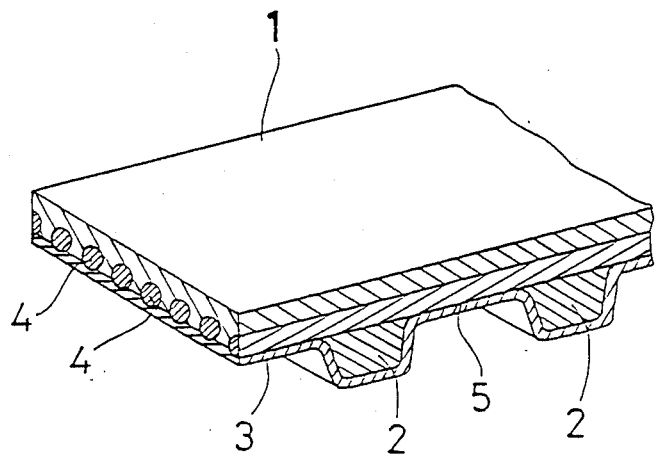
FIG. 1 is a perspective view showing a toothed belt in part.

The toothed belt of this invention, which has the same external appearance as the conventional toothed belt shown in FIG. 1, comprises a back surface section 1, tooth sections 2, a tooth cloth 3 covering the tooth sections 2 and the tooth lands 5 positioned between the adjacent tooth sections 2, and a plurality of core fibers 4 running through the inside of the back surface section 1. Each of the core fibers 4 also comes into contact with the tooth cloth 3.

The elastic substance constituting the back surface section 1 and the tooth sections 2 is a hydrogenated acrylonitrile-butadiene copolymer (H—NBR) with a hydrogenation rate of 80% or more that has durability that cannot be obtained using the conventional CR and such materials as were mentioned in "BACKGROUND OF THE INVENTION." With H—NBR of a hydrogenation rate of less than 80%, the resistance to ozone is inferior, but with H—NBR of a hydrogenation rate of 80% or more, the heat resistance, ozone resistance, etc., are excellent, and moreover the resistance to thermosetting, internal generation of heat, cold, and oil is superior. Therefore, it is preferable to use H—NBR with a hydrogenation rate of 80% or more for the elastic substance constituting the back surface section 1 and the tooth sections 2 of the toothed belt.

The tooth cloth 3 is constructed of industrial nylon raw fiber having a relative viscosity compared to sulfuric acid of 2.6 to 2.8 and having excellent heat resistance. The tensile strength of the said industrial nylon raw fiber is 5 g/denier or more. For example, if the single fiber were of the same fineness as that used for clothing nylon raw fiber, it could be stronger than the conventional nylon raw fiber used for clothing. Moreover, when the cloth is manufactured using industrial nylon raw fiber having a small diameter, of 5 denier or less, for the fineness of a single fiber, the surface of the cloth is extremely soft and flexible, as well as being very resistant to abrasion. Therefore, the tooth cloth made of industrial nylon raw fiber with a small diameter of 5 denier or less has excellent tensile strength, heat resistance, and abrasion resistance. The adhesion of this kind of tooth cloth 3 to the hydrogenated NBR constituting the back surface section 1 and the tooth sections 2 is so satisfactory that the formation of cracks in the base of the tooth sections because of bending while in motion can be suppressed, so such a tooth cloth is desirable for a toothed belt.

The core fibers 4 are, as for conventional core fibers, obtained by first making a first twist and then a final twist of a bundle of glass fiber filaments. For the glass fiber filaments, filaments such as ECG-150 as specified in JIS R3413 can be used. To increase the adhesiveness of the filaments to the hydrogenated NBR, they are treated with resorcinol formaldehyde latex (RFL) obtained by mixing gum latex with a resorcinol formaldehyde resin allowed to undergo a condensation reaction.

The core fibers 4 are attached by vulcanization to the H—NBR with a hydrogenation rate of 80% or more forming the back surface section 1 and the tooth sections 2 and to the industrial nylon raw fiber forming the tooth cloth 3. The amount of internal heat generated during bending of these core fibers 4 depends upon the first twist number and final twist number of the glass fiber filaments of the core fibers 4 and also on the diameter of the core fibers 4. Within certain limits established for the final twist number, first twist number, and diameter of the core fibers 4, this amount can be made small. That is, if the limits are set as 1.7 to 2.6 twists/inch for the first twist number, 1.8 to 2.3 twists/inch for the final twist, and 0.9 to 1.1 mm, preferably 0.95 to 1.05 mm, for the diameter of the core fibers 4, when they are in contact with the hydrogenated NBR and the tooth cloth (when in a toothed belt), the amount of internal heat generated will be quite small.

Moreover, if the ratio of the diameter of the core fibers 4 to the thickness of the tooth cloth 3 is established within certain limits, when the core fibers 4 are in contact with the back surface section 1 and/or the tooth sections 2 made of the hydrogenated NBR and the tooth cloth 3 made of the industrial nylon raw fiber, premature fatigue of the core fibers 4 from bending, loss of teeth in the tooth sections 2, and jumping during movement can be prevented. That is, when the ratio of the diameter of the core fibers 4 to the thickness of the tooth cloth 3 in a finished toothed belt is 1.8 or less, jumping during movement readily arises, and on the other hand, when the ratio is 5.0 or more, the durability of the teeth is rapidly decreased, accompanying a decrease in the prevention of jumping. Therefore, setting the ratio of the diameter of the core fibers 4 to the thickness of the tooth cloth 3 within the limits of 1.8 to 5.0, preferably 2.0 to 4.2, allows the prevention of such problems as premature fatigue of the core fibers from bending, loss of teeth, and jumping during movement.

EXAMPLES

Figure 2:
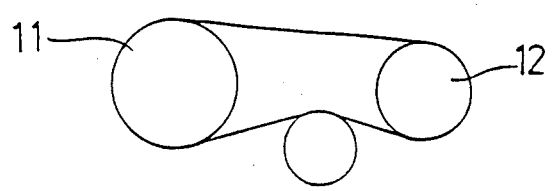
FIG. 2 is a schematic diagram showing the transmission drive of a toothed belt using a driving pulley (12) and a driven pulley (11).
Figure 3:
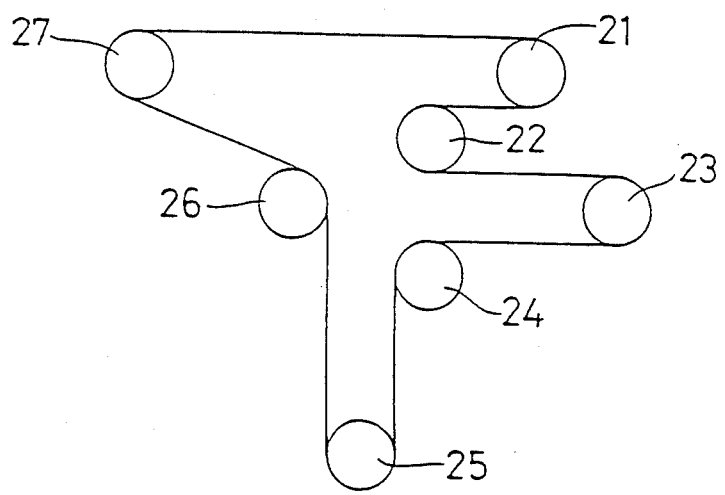
FIG. 3 is a schematic diagram showing the transmission drive of a toothed belt using a driving pulley (25) and a number of driven pulleys (27, 21, 23).

Nine kinds of toothed belts of this invention were manufactured, with 92 teeth of the tooth shape ZB (JASO E105-81, for automobile belts, and E106-81, for pulleys), under the conditions specified in Table 1 in which the hydrogenation rate of the H—NBR was varied from 80% to 99%, the diameter of the core fibers was varied from 0.95 mm to 1.10 mm, the first twist number of the core fibers was varied from 1.7 twists/inch to 2.6 twists/inch, the final twists number of the core fibers was from 1.8 twists/inch to 2.3 twists/inch, and the ratio of the diameter of the core fibers to the thickness of the tooth cloth was from 1.8 to 5.0. These nine different belts were tested by a tri-axial drive test in which each of the belts was engaged with three pulleys as shown in FIG. 2. Also, by using the conditions specified in Table 1 for columns 4, 6, and 8, with 96 teeth of the tooth shape ZA, three additional kinds of the toothed belt of this invention were manufactured and tested by a poly-bending drive test in which each of the belts was engaged with many pulleys as shown in FIG. 3. Each belt was manufactured by placing a tooth cloth, core fibers, and unvulcanized hydrogenated NBR compound in this order into a mold, and then vulcanizing the H—NBR compound.

In the tri-axial drive test (FIG. 2), the driving toothed pulley 12 was 20ZB (JASO E105-81, E106-81), and the driven toothed pulley 11 was 40ZB. The driving pulley 12 rotated at 6000 rpm. The initial tension of the toothed belt (the width thereof being 19 mm) was set at 15 kg·f and the horsepower was set at 10. The ambient temperature was set at 90° C. The time taken until the toothed belt was damaged was measured, and the results are shown in Table 1. The operation time taken until the hydrogenated NBR reached a hardness of 90 (JIS A) is also shown in Table 1. Internal heat generated in the toothed belt increases the hardness of the rubber of the back surface section, so an increase in this hardness was used as an index of the amount of internal heat generated.

In the poly-bending drive test shown in FIG. 3, toothed pulleys 21, 23, 25, and 27 were 14ZA and the other pulleys 22, 24 and 26 were flat pulleys with a diameter of 52 mm. The initial tension of the toothed pulleys (the width thereof being 19 mm) was 13 Kg·f. The belt was operated by rotating the driving pulley 25 at 4500 rpm without any load at room temperature. The time taken until the toothed belt was damaged under these operation conditions was measured, and the results are shown in Table 1.

The preferred belt construction following the invention, is a belt as shown in Example 2 of Table 1. It will be noted that the durability of the belt construction is superior to the other possible combinations studied.

As a reference standard example, according to the specifications shown in Table 2, ten kinds of toothed belt were made with the same tooth number and the same tooth shape as those made using the specifications in Table 1, and tested by a tri-axial drive test and a poly-bending drive test under the same operation conditions as mentioned above. The time taken until each of the toothed belts was damaged was measured, and the results are shown in Table 2. The operation time taken until the rubber reached a hardness of 90 (JIS A) is also shown in Table 2.

In Table 2, the varieties of rubber were chloroprene rubber (CR) and hydrogenated NBR (HNBR). The percentage of hydrogenation of the HNBR is shown in parentheses. The material A for the tooth cloth was industrial nylon raw fiber, and the material B was clothing nylon raw fiber. The asterisks (*) show each construction condition which is within this invention.

When the results of Tables 1 and 2 are compared, it is seen that the operation time taken until damage appeared in the toothed belt of this invention shown in Table 1 was from 2 to 6 times or more the same time shown in Table 2, which indicates a great increase in the durability of the belts of this invention shown in Table 1. The time taken until the rubber used for the toothed belt reached the hardness of 90 shows the same pattern as the operation time mentioned above, which indicates that the toothed belt of this invention, compared to the reference standard toothed belts shown in Table 2, produced much less internal heat.

TABLE 1

| Example | | 1 | 2 | 3 | 4 | 5 | 6 | 7 | 8 | 9 |
|---|---|---|---|---|---|---|---|---|---|---|
| Hydrogenation (%) of NBR | | 95 | 90 | 99 | 90 | 95 | 97 | 90 | 95 | 80 |
| Diameter (mm) of Core Fibers | | 1.05 | 0.95 | 1.10 | 1.00 | 0.95 | 0.95 | 1.00 | 1.10 | 1.05 |
| First Twist Number (twists/inch) | | 2.4 | 2.0 | 2.5 | 2.2 | 1.8 | 2.6 | 2.4 | 2.0 | 1.7 |
| Final Twist Number (twists/inch) | | 1.9 | 2.0 | 1.9 | 2.3 | 2.0 | 1.8 | 2.0 | 2.2 | 1.8 |
| Diameter of Core Fibers/ Thickness of Tooth Cloth | | 3.7 | 4.2 | 3.7 | 2.0 | 5.0 | 3.8 | 1.8 | 4.8 | 2.1 |
| Operation Time (hrs) taken until the toothed belts were damaged | Tri-Axial | 1850 | 1920 | 1510 | 1570 | 1390 | 1490 | 1260 | 1350 | 1020 |
| | Poly-Bending | — | — | — | 830 | — | 810 | — | 780 | — |
| Hardness of the rubber of the back surface section when the belts were damaged (JIS A) | Tri-Axial | 92 | 91 | 88 | 90 | 88 | 89 | 90 | 91 | 94 |
| | Poly-Bending | — | — | — | 80 | — | 79 | — | 79 | — |
| Time (hrs) taken until the rubber reached a hardness of 90 (JIS A) | Tri-Axial | 1610 | 1780 | — | 1570 | — | — | 1260 | 1240 | 800 |
| | Poly-Bending | — | — | — | — | — | 810 | — | 768 | — |

TABLE 2

| Control | 1 | 2 | 3 | 4 | 5 | 6 | 7 | 8 | 9 | 10 |
|---|---|---|---|---|---|---|---|---|---|---|
| Rubber (percentage of hydrogenation) | CR | CR | CR | *HNBR (90) | HNBR (70) | HNBR (70) | HNBR (75) | HNBR (62) | HNBR (62) | HNBR (75) |
| Diameter (mm) of Core Fibers | 1.16 | *0.95 | 1.16 | 1.16 | *1.05 | *1.05 | 1.15 | 0.8 | 0.8 | *1.07 |
| First Twist Number (twists/inch) | 4.0 | *2.5 | 4.0 | 4.2 | *1.8 | *1.8 | 1.5 | *2.0 | 2.7 | *2.5 |

TABLE 2-continued

| Control | 1 | 2 | 3 | 4 | 5 | 6 | 7 | 8 | 9 | 10 |
|---|---|---|---|---|---|---|---|---|---|---|
| Final Twist Number (twists/inch) | *2.0 | *2.0 | *2.0 | *2.2 | 1.2 | 1.2 | *2.0 | *2.2 | *2.2 | *1.9 |
| Diameter of Core Fibers/ Thickness of Tooth Cloth | 5.5 | *3.5 | 5.5 | *4.0 | *3.5 | 1.5 | *3.8 | *2.7 | 5.5 | *3.2 |
| Material for Tooth Cloth  A: Industrial Nylon Raw Fiber  B: Clothing Nylon Raw Fiber | B | B | *A | B | B | B | B | *A | *A | *A |
| Tri-Axial | | | | | | | | | | |
| Operation Time (hrs) taken until the toothed belts were damaged | 420 | 550 | 530 | 750 | 210 | 180 | 210 | 320 | 190 | 270 |
| Hardness of the rubber of the back surface section when the belts were damaged (JIS A) | 93 | 92 | 94 | 90 | 86 | 87 | 85 | 92 | 86 | 86 |
| Time (hrs) taken until the rubber reached a hardness of 90 (JIS A) | 312 | 468 | 325 | 750 | — | — | — | 272 | — | — |
| Poly-Bending | | | | | | | | | | |
| Operation Time (hrs) taken until the toothed belts were damaged | 520 | 690 | 528 | — | — | — | — | — | — | — |
| Time (hrs) taken until the rubber reached a hardness of 90 (JIS A) | 510 | 608 | 512 | — | — | — | — | — | — | — |

Note:
*shows each construction condition which is within this invention.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A toothed belt comprising:
   (1) a back surface section and tooth section that are made of a hydrogenated acrylonitrilebutadiene copolymer (H—NBR) with a hydrogenation rate of 80% or more,
   (2) a tooth cloth that covers said tooth section and tooth lands positioned between the adjacent tooth sections, said tooth cloth adjacent tooth sections, said tooth cloth being made of industrial nylon raw fiber with a viscosity relative to sulfuric acid of 2.6 to 2.8, a tensile strength of 5 g/denier or more, and a fineness of single fibers of 5 denier or less, and
   (3) a plurality of core fibers running through the inside of said back surface section with a core fiber diameter of 0.9 to 1.1 mm and a ratio of said core fiber diameter to said tooth cloth thickness in the range of 1.8 to 5.0, said core fibers being made of glass fiber filaments with a first twist number of 1.7 to 2.6 twists/inch, and a final twist number of 1.8 to 2.3 twists/inch, twisted together.

2. The toothed belt set forth in claim 1, wherein the ratio of said core fiber diameter to said tooth cloth thickness is in the range of 2.0 to 4.2.

3. The toothed belt set forth in claim 1, wherein said core fiber diameter ranges from 0.95 to 1.05 mm.

* * * * *